(12) United States Patent
Matsudaira

(10) Patent No.: US 9,168,666 B2
(45) Date of Patent: Oct. 27, 2015

(54) DEVICE AND METHOD FOR RIPPING GUM OF CONVEYOR BELT

(75) Inventor: Nobuhide Matsudaira, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 508 days.

(21) Appl. No.: 13/392,285

(22) PCT Filed: Aug. 20, 2010

(86) PCT No.: PCT/JP2010/064062
§ 371 (c)(1),
(2), (4) Date: Feb. 24, 2012

(87) PCT Pub. No.: WO2011/024714
PCT Pub. Date: Mar. 3, 2011

(65) Prior Publication Data
US 2012/0160075 A1 Jun. 28, 2012

(30) Foreign Application Priority Data
Aug. 25, 2009 (JP) .................................. 2009-193810

(51) Int. Cl.
*B26D 1/03* (2006.01)
*B26D 1/04* (2006.01)
(Continued)

(52) U.S. Cl.
CPC *B26D 3/003* (2013.01); *B26D 1/03* (2013.01); *B26D 1/035* (2013.01); *B26D 1/045* (2013.01);
(Continued)

(58) Field of Classification Search
CPC ............ B26D 1/01; B26D 1/015; B26D 1/02; B26D 1/025; B26D 1/03; B26D 1/035; B26D 1/04; B26D 1/045; B26D 3/003; B26D 3/08; B26D 3/282; B26D 2001/006; B29L 2031/7092; Y10T 83/0296

USPC ............... 83/52, 865, 874, 49, 569, 622, 681, 83/856–858, 949, 56, 614, 862; 30/90.1, 30/90.4, 92.5, 316, 302, 294; 99/547, 563
See application file for complete search history.

(56) References Cited

U.S. PATENT DOCUMENTS 3,820,240 A * 6/1974 Witsell ............................ 30/294
7,200,939 B2 * 4/2007 Arita ............................... 30/294
(Continued)

FOREIGN PATENT DOCUMENTS

| CN | 88101656 A | 11/1988 |
| JP | 63-267193 A | 11/1988 |

(Continued)

OTHER PUBLICATIONS

International Search Report of PCT/JP2010/064062 dated Nov. 16, 2010.
(Continued)

*Primary Examiner* — Clark F Dexter
(74) *Attorney, Agent, or Firm* — Sughrue Mion, PLLC

(57) ABSTRACT

Provided are a device and a method for ripping gum of a conveyor belt in which the burden and danger to workers can be reduced, and gum around each of the steel cords can be cut off nearly completely and sufficiently uniformly, regardless of worker skill, and with higher work efficiency. The device is for ripping gum of a conveyor belt in which individual steel cords embedded in gum of a conveyor belt are separated between each other, and gum is stripped off around each of the steel cords after the separation. The device includes a V-shaped cutting blade having a shape such that the upper end and the lower end of the cutting blade are protruded with respect to the traveling direction of the conveyor belt for separating between the individual steel cords, and a cylindrical cutting blade for stripping gum off around each of the steel cords.

4 Claims, 5 Drawing Sheets

(51) Int. Cl.
 *B26D 3/00* (2006.01)
 *B29B 17/02* (2006.01)
 *B26D 3/08* (2006.01)
 *B26D 3/28* (2006.01)
 *B26D 7/00* (2006.01)
 *B29K 21/00* (2006.01)
 *B29K 705/12* (2006.01)
 *B29L 31/00* (2006.01)
 *B26D 1/00* (2006.01)

(52) U.S. Cl.
 CPC *B26D 3/08* (2013.01); *B26D 3/282* (2013.01); *B29B 17/02* (2013.01); *B26D 1/04* (2013.01); *B26D 7/0006* (2013.01); *B26D 2001/006* (2013.01); *B29K 2021/00* (2013.01); *B29K 2705/12* (2013.01); *B29L 2031/7092* (2013.01); *Y02W 30/622* (2015.05); *Y02W 30/68* (2015.05); *Y10T 83/0296* (2015.04)

(56) References Cited

U.S. PATENT DOCUMENTS

| | | | |
|---|---|---|---|
| 8,127,456 B2 * | 3/2012 | Arita | 30/314 |
| 2004/0079209 A1 | 4/2004 | Arita | |
| 2009/0013539 A1 * | 1/2009 | Arita | 30/314 |

FOREIGN PATENT DOCUMENTS

| | | |
|---|---|---|
| JP | 7-106552 B2 | 11/1995 |
| JP | 9-109087 A | 4/1997 |
| JP | 2001-198881 A | 7/2001 |
| JP | 4166575 B2 | 10/2008 |

OTHER PUBLICATIONS

Chinese Office Action and Search Report issued in Chinese Application No. 201080037731.3 dated Dec. 4, 2013.

\* cited by examiner

Fig.2 (c) (Prior Art)

DEVICE AND METHOD FOR RIPPING GUM OF CONVEYOR BELT

TECHNICAL FIELD

The present invention relates to a device and a method for ripping gum of a conveyor belt (hereinafter, also simply referred to as "a ripping device" and "a ripping method", respectively), and more particularly, to a device for ripping gum for attaining endless connection of a conveyor belt and a method for ripping gum.

BACKGROUND ART

When attaining endless connection of a conveyor belt having, as core bodies, steel cords, it is necessary for all the embedded steel cords to be stripped across the lengths from both ends of the conveyor belt to prescribed lengths. This work is performed by stripping off an upper covering gum and a lower covering gum individually and removing gum around the steel cords cleanly. Conventionally, such a work has been generally performed manually by using a knife or an electrothermal cutter (see, for example, FIG. 11 in Patent Document 1).

However, such a conventional method requires much person-hour, and has very poor work efficiency, which has been problematic. For example, for a conveyor belt having specifications of 1800 mm for the belt width, $\phi$110 mm×110 for the steel cords, 16 mm for the thickness of the covering gum, 8 mm for the thickness of the lower covering gum, in order for the all the steel cords to be stripped across 4 m length, it takes 16 work hours for 8 persons. Particularly, for a belt having a long distance, since it has increased number of endless areas, it takes still more hours. Since such a work itself is heavy and is a work using a knife or an electrothermal cutter requiring many persons, it is highly dangerous, which has also been problematic. In addition, there has been difficulty that the quality thereof is greatly affected by the unevenness of the sharpness of the knives, the level of skill of the workers or the like.

In order to solve the above problems, in Patent Document 1, for example, a device for ripping gum of a conveyor belt is proposed which includes a cylindrical cutting blade portion and linear cutting blade portions which protrude upward and downward from the cylindrical cutting blade portion; wherein gum around the steel cord is ripped by the cylindrical cutting blade portion, as well as, the upper and lower covering gum is ripped by the linear cutting blade portions. In this technique, a device to which two types of cutting blades are attached is pulled by a winch or the like, and is allowed to proceed in the belt length direction, and gum of the upper and the lower covering and gum around the steel cord is cut off. Specifically, first, a part of the steel cord of the belt is exposed (FIG. 2 in Patent Document 1), and a device composed of a linear cutting blade which longitudinally rips an upper surface covering gum and a lower surface covering gum (signs 8, 9 in FIG. 1 in Patent Document 1), and a cylindrical cutting blade which removes remaining gum around the steel cords (sign 5 in FIG. 1 in Patent Document 1) is attached thereto. Thereafter, gum of the upper and the lower covering and gum around the steel cord is cut off at once by pulling this device by a winch or the like and allowing this device to proceed in the belt length direction (FIG. 8 in Patent Document 1).

As a further modification of the above technique, in Patent Document 2, as a ripper for separating the individual steel cords, a ripper including a cutting blade having a three-blade-structure formed by sandwiching a thin blade having a V-shape at the blade edge portion between double holder blades having a V-shape at the blade edge portions such that this thin blade edge is more protruded than the holder blade edges is proposed; and, as a ripper for stripping gum off around each of the steel cords, a ripper in which a cylindrical cutting blade formed by sandwiching a linear thin blade between double cutting blades having a half-cylindrical shape such that the linear thin blade is protruded in the upward direction thereof and in the downward direction thereof is detachably attached inside double holders which extend to the linear thin blade is proposed.

RELATED ART DOCUMENTS

Patent Documents
Patent Document 1: Japanese Unexamined Patent Application Publication No. 63-267193 ((Japanese Examined Patent Application Publication No. 7-106552), claims and the like)
Patent Document 2: Japanese Patent No. 4166575 (claims and the like)

SUMMARY OF THE INVENTION

Problems to be Solved by the Invention

By the techniques in Patent Documents 1 and 2, the work efficiency can be improved compared with a conventional manual work, as well as, the workload of workers and danger to the workers can be reduced, and gum around each of the steel cords can be cut off nearly completely and sufficiently uniformly, regardless of skill of workers.

However, in the case of the device according to Patent Document 1, both of the cutting blade and the steel cord are sometimes damaged by the contact between the tip of the cylindrical cutting blade and the steel cord, due to frequent occurrence of unintentional movements when being pulled by a winch. Since there are cases where a covering gum having a large belt thickness or the like is hard to be cut by the linear cutting blade due to its high resistance, a work of ripping covering gum and a work of cutting off gum around the steel cords are sometimes required to be performed separately depending of the specification of the belt, that is, a two-step cutting work has sometimes been required to be performed. Further, there also has been a problem that maybe because gum around the steel cord is to be cut off in advance, the blade moves from side to side when ripping is carried out, for example, in the form of FIG. 5 in the cited document 1, whereby the cutting cannot be carried out sufficiently.

The technique according to Patent Document 2 has been poor with regard to work efficiency, as a result that the ripping function has been divided into that of a ripper for separating between individual steel cords and that of a ripper for stripping gum off around each of the steel cords.

Accordingly, an object of the present invention is to overcome the drawbacks in the conventional art and to provide a device and a method for ripping gum of a conveyor belt in which the workload of workers and danger to the workers can be reduced, and gum around each of the steel cords can be cut off nearly completely and sufficiently uniformly, regardless of skill of workers, as well as, the work efficiency is more favorable than before.

Means for Solving the Problems

The present inventor intensively studied to find out that the above-mentioned problems can be overcome by integrating a ripping member which separates the steel cords with gum one by one and a ripping member which strips gum off around the steel cord, and at the same time, by performing in advance the ripping by the ripping member which separates the steel cords with gum one by one.

That is, the device for ripping gum of a conveyor belt of the present invention is a device for ripping gum of a conveyor belt in which individual steel cords embedded in gum of a conveyor belt are separated between each other, and gum is stripped off around each of the steel cords after the separation, which comprises a V-shaped cutting blade having a shape such that the upper end and the lower end of the cutting blade are protruded with respect to the traveling direction of the conveyor belt for separating between the individual steel cords, and a cylindrical cutting blade for stripping gum off around each of the steel cords.

In the ripping device of the present invention, it is preferable that a linear cutting blade which incises gum around each of the steel cords be arranged between the V-shaped cutting blade and the cylindrical cutting blade. In this case, it is more preferable that the linear cutting blade be arranged along the width direction of the conveyor belt.

The method for ripping gum of a conveyor belt of the present invention is a method for ripping gum of a conveyor belt in which individual steel cords embedded in gum of a conveyor belt are separated between each other, and gum is stripped off around each of the steel cords after the separation, which comprises separating individual steel cords embedded in gum of the conveyor belt between each other by a V-shaped cutting blade having a shape such that the upper end and the lower end of the cutting blade are protruded with respect to the traveling direction of the conveyor belt, and thereafter, stripping gum off around each of the separated steel cords by a cylindrical cutting blade.

In the ripping method of the present invention, it is preferable that, after the individual steel cords are separated between each other by the V-shaped cutting blade and before gum around each of the separated steel cords is stripped by a cylindrical cutting blade, gum around each of the steel cords be incised by a linear cutting blade.

Effects of the Invention

By the present invention, a device and a method for ripping gum of a conveyor belt in which the workload of workers and danger to the workers can be reduced, and gum around each of the steel cords can be cut off nearly completely and sufficiently uniformly, regardless of skill of workers, as well as, the work efficiency is more favorable than before can be attained.

MODES FOR CARRYING OUT THE INVENTION

An embodiment of the present invention will be described in detail with reference to the drawings.

Figure 1:
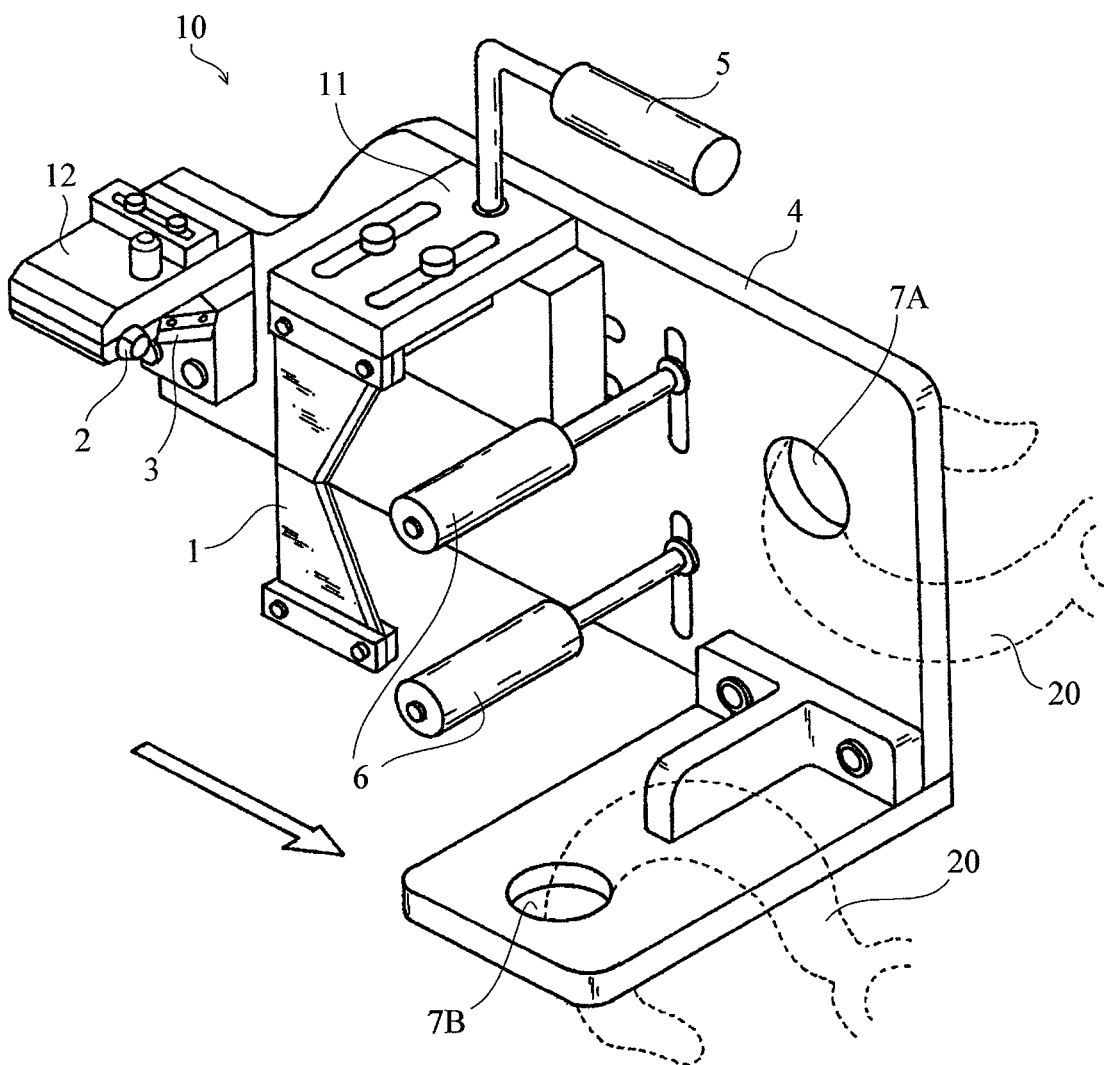
FIG. 1 is a perspective view of a device for ripping gum of a conveyor belt according to one embodiment of the present invention.

FIG. 1 is a perspective view of a device for ripping gum of a conveyor belt according to one embodiment of the present invention. A device for ripping gum 10 of the present invention separates individual steel cords embedded in gum of a conveyor belt from each other and strips gum off around each of the steel cords after the separation. As illustrated, the device includes a V-shaped cutting blade 1 having a V-shape at the blade edge portion for separating the individual steel cords from each other, and a cylindrical cutting blade 2 for stripping gum off around each of the steel cords.

Figure 2:
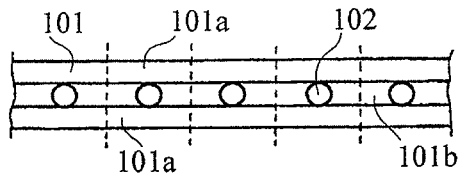
FIGS. 2(a) and 2(b) are a cross-sectional view of a separated state of individual steel cords according to the present invention.
FIG. 2(c) is a cross-sectional view of a separated state of individual steel cords according to a conventional art.
Figure 2:
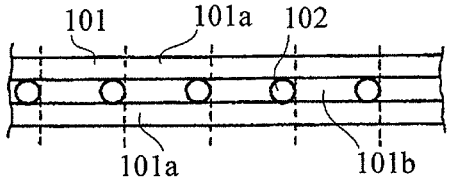

In FIG. 2, examples (a), (b) of the separated state of the individual steel cords according to the present invention, and an example (c) of the separated state of the individual steel cords according to the conventional art are illustrated as a cross-sectional view of each conveyor belt. As illustrated, in the conventional art, the cross section of gum 101 of the conveyor belt is separated such that only the upper and the lower covering gum layers 101a of steel cord 102 are ripped. In the present invention, on the other hand, the belt is separated such that the belt of the whole thickness between steel cord 102 and steel cord 102 including the covering gum layer 101a and a bonding gum layer 101b is ripped. In the present invention, since the steel cords are separated one by one by the V-shaped cutting blade 1 at first, such a difference arises at the point of separation.

As described above, by arranging the V-shaped cutting blade 1 having a V-shape at the blade edge portion such that the whole thickness of the belt is ripped, the V-shaped cutting blade 1 proceeds stably while separating the conveyor belt between the steel cords, whereby the V-shaped blade 1 functions as a guide. The cylindrical cutting blade 2 attached thereafter can therefore be allowed to proceed along the steel cords, whereby an endless step portion having a stable shape quality can be obtained. Since cylindrical cutting blade 2 proceeds stably, the cutting blade is not in contact with the steel cords and the frequency of damaging the blade edge or the steel cords can be reduced to a great degree. By this, a small number of spare blades are required, and person-hours for detachment of the device for every replacement can be reduced.

Further, in the ripping device of the present invention, by employing a V-shaped cutting blade 1 for separating the individual steel cords, that is, by employing a cutting blade having a shape such that the upper end and the lower end of the cutting blade are protruded, the resistance during ripping can be reduced. By this, ripping of the covering gum and cutting off of gum around the steel cords which have conventionally been conducted separately depending on specifications of the belt such as the thickness of the belt or the hardness of the covering gum can surely be completed in a single ripping work.

Still further, in the present invention, by arranging the V-shaped cutting blade 1 for separating the individual steel cords from each other, and the cylindrical cutting blade 2 for stripping gum off around each of the steel cords in the order mentioned to form a device, a problem of oscillation of the blade edge does not occur since the steel cords are separated one by one by allowing the V-shaped cutting blade 1 to pass first, and then are cut by the cylindrical cutting blade 2. Accordingly, by the present invention, gum around the individual steel cords can be cut off nearly completely and sufficiently uniformly with higher work efficiency without causing any conventional problems.

Figure 3:
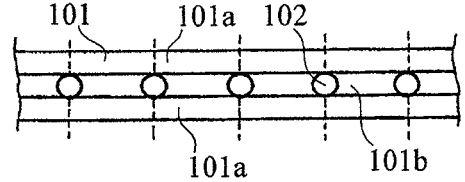
FIG. 3 is a perspective view of one example of the state of gum around a steel cord stripped by the present invention.
Figure 3:
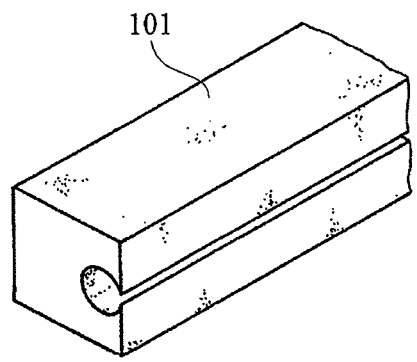
Figure 4:
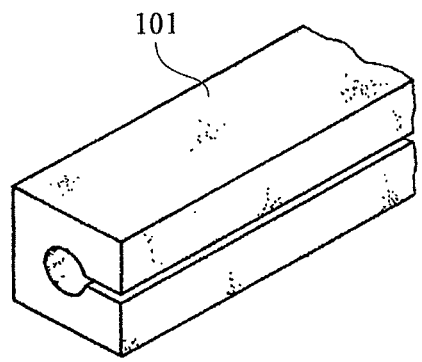
FIG. 4 is a perspective view of another example of the state of gum around a steel cord stripped by the present invention.

Here, as illustrated in FIG. 2(*b*), if the separation by the V-shaped cutting blade 1 is performed almost at gum around the steel cord 102, by performing ripping by the cylindrical cutting blade 2 thereafter, gum 101 among the steel cords can be stripped as illustrated in FIG. 3. On the other hand, as illustrated in FIG. 2(*a*), in cases where separation is performed at the position between the steel cord 102 and the steel cord 102 distant from the steel cord 102, if ripping is tried to be performed by the cylindrical cutting blade 2, ripping itself soon cannot be performed since the ripped gum is trapped. Accordingly, in the present invention, as illustrated in FIG. 1, it is preferable that a linear cutting blade 3 for incising gum around each of the steel cords 102 be arranged in the vicinity of the cylindrical cutting blade 2. In this way, by arranging the linear cutting blade 3 between the V-shaped cutting blade 1 and the cylindrical cutting blade 2, gum around the steel cords are incised by the linear cutting blade 3 in advance and can be passed to the cylindrical cutting blade 2, whereby gum 101 around the steel cords can be easily stripped off as illustrated in FIG. 4.

This linear cutting blade 3 is not particularly limited as regards to the location where it is arranged or the number thereof as long as it is arranged at the vicinity of the cylindrical cutting blade 2 and can incise gum around the steel cord, and preferably, as illustrated, one blade is arranged along the width direction of the conveyor belt. By arranging the linear cutting blade 3 along the width direction of the conveyor belt, the linear cutting blade 3 rips the bonding gum layer 101b, whose gum is soft, not the upper and the lower covering gum layers 101a of the conveyor belt, thereby reducing the ripping resistance. Since the cylindrical cutting blade 2 incises the gum around the steel cords immediately before the gum is cut off, the cylindrical cutting blade 2 can proceed smoothly and stably.

Although, since a conventional cylindrical cutting blade is a right-left divide type, there has been a drawback that it takes effort to attach it to a conveyor belt, in the present invention, even when the linear cutting blade 3 is provided, if it is provided in a horizontal direction along the width direction of the conveyor belt, the cylindrical cutting blade 2 can be made an upper-lower divide type, as illustrated. By this, a merit can be obtained in which the blade can be attached and detached to a belt processed portion easily.

The V-shaped cutting blade 1, the cylindrical cutting blade 2 and the linear cutting blade 3 used in the present invention can be formed of tool steel such as SK, SKS, SKD, SKH and other enough rigid steel. Since, as the V-shaped cutting blade 1, an inexpensive commercially available blade can be used, a sharp edge can always be maintained. Also as the linear cutting blade 3, an inexpensive commercially available blade can be used, and a sharp edge can always be maintained. Further, as the V-shaped cutting blade 1, it is preferable that two cutting blades be used combined in an upper-lower manner, and the angle θ between each of the cutting blades and the ripping traveling direction is preferably 50° to 70° and particularly 60° (see FIG. 5). By setting the angle of the cross-section of blade edge in such a manner, ripping resistance of the conveyor belt can be made small, and the ripping straightness can be secured. Further, the angle of the V-shape portion of the V-shaped cutting blade 1 is suitably 110° to 130°, and particularly 120°. Still further, the angle of the blade edge of the cylindrical cutting blade 2 is preferably 25° to 35°, and particularly 25° to 30°. Still further, it is preferred that the distance from the V-shaped cutting blade 1 to the cylindrical cutting blade 2 be spaced to some extent, for example, 80 mm or higher, specifically about 80 to 120 mm, in order for gum stripped off from the steel cord by the cylindrical cutting blade 2 to easily escape.

The device for ripping gum of the present invention includes the above-mentioned V-shaped cutting blade 1 and the cylindrical cutting blade 2 and suitably further includes the linear cutting blade 3 according to the above conditions, and minute structures other than above are not particularly limited. For example, in the illustrated device for ripping gum 10, the V-shaped cutting blade 1 is attached to a base 4 such that the blade is movable freely up and down and detachably via a holder portion 11. When the blade is attached to or detached from the conveyor belt of the device, the V-shaped cutting blade 1 can be moved upward. The numeral 5 in the figure represents a gripper. The cylindrical cutting blade 2 and the linear cutting blade 3 are attached to the base 4 detachably via a holder portion 12 which can be divided up and down. Among these, the linear cutting blade 3 is attached thereto such that, as illustrated, the blade edge makes an angle such that the blade edge becomes more distant in direction from the vicinity of the cylindrical cutting blade 2 to the traveling direction (the direction of the arrow in the figure), for example, the angle between the cutting blade and the ripping traveling direction is suitably 50° to 70°, and particularly 60°. Further, the V-shaped cutting blade 1, the cylindrical cutting blade 2 and the linear cutting blade 3 are arranged appropriately movably in each direction in order to adjust the positional relationship between the members depending on the specifications thereof.

Figure 5:
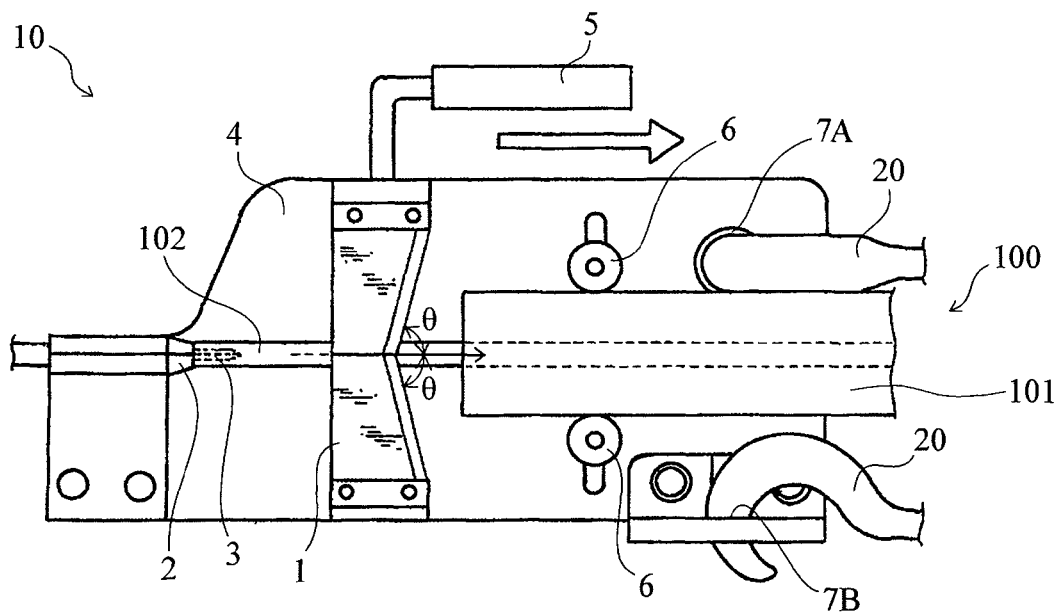
FIG. 5 is an explanatory view of one process of a method for ripping gum of a conveyor belt of the present invention.

The numeral 6 represents a rotatable roller-shaped pressing tool. By arranging a pair of such roller-shaped pressing tools 6 on the base 4, and making a conveyor belt 100 sandwiched therebetween as illustrated in FIG. 5, the device can be made to proceed in a more stably fixed state with respect to the conveyor belt. The roller-shaped pressing tool 6 is formed such that the position thereof can be adjusted up and down depending on the thickness of the conveyor belt. They can be arranged not only in one pair but also in two pairs.

The alphanumerals 7A and 7B represent, as illustrated, hooking portions of the base 4 for hooking a hook 20 when device is pulled by a winch or the like. Although devices according to conventional Patent Documents 1 and 2 needed to be pulled evenly by providing a pulling tool such as a winch up and down, since the device itself can be made to proceed smoothly and stably by employing a device structure of the present invention, the device of the present invention becomes such that only the hooking portion 7A is pulled by providing the hooking portion 7A in the front in the traveling direction. By this, a work of attaching an attachment tool such as a winch to the device after attaching the V-shaped cutting blade 1 in such a manner that the blade is inserted between the steel cords of the conveyor belt becomes unnecessary. By once moving the V-shaped cutting blade upward, and inserting it vertically, or by utilizing a rotatable insertion mechanism having a part of the device as a fulcrum, the device can be attached. Suitably, as illustrated, by pulling evenly by hooking the hook 20 on the two hooking portions 7A, 7B, the device can made proceed more stably.

Next, a suitable embodiment of a method for ripping gum by using the device for ripping gum 10 of the present invention will now be described in detail.

Figure 6:
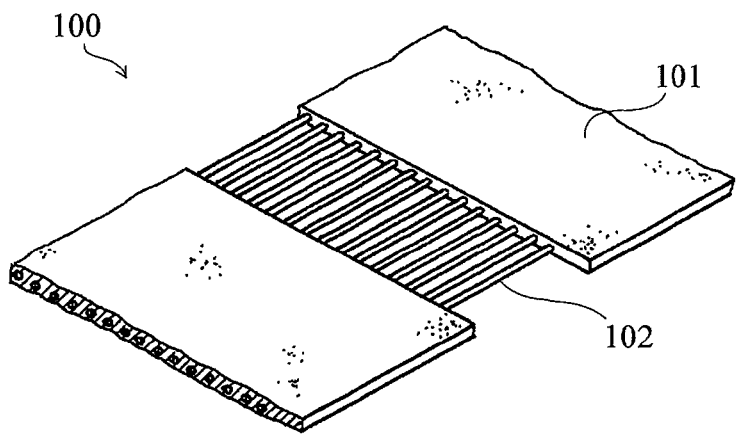
FIG. 6 is an explanatory view of a pre-processing process of a conveyor belt.

First, a required length for the endless connection is spaced from the end of the conveyor, and the upper and the lower covering gum layers 101a of the conveyor belt 100 are cut off along the steel cords 102. Thereafter, the bonding gum portion 101b positioned between the steel cords 102 is cut off by a knife or an electrothermal cutter, whereby the steel cords 102 are separated from each other, and a state wherein some amount of the bonding gum layer 101b around each of the steel cords 102 remains is formed. Further, by stripping the bonding gum layer portion 101b off around each of the steel cords 102 by the knife, a state that, as illustrated in FIG. 6, in the conveyor belt 100, the steel cord 102 is exposed to the degree that the cord 102 is stored in the cylindrical cutting blade 2 is made (pre-processing).

Figure 7:
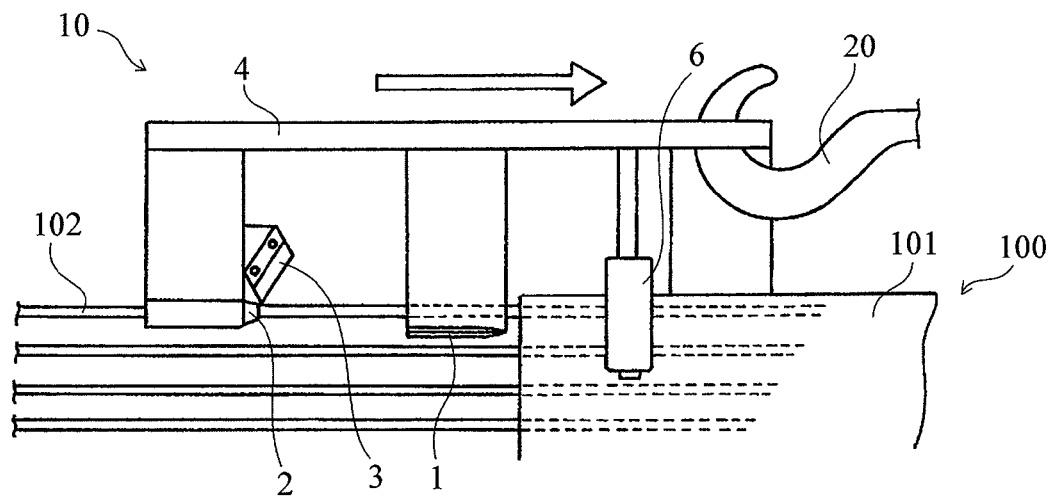
FIG. 7 is an explanatory view of one process of a method for ripping gum of a conveyor belt of the present invention.

Next, in the exposed portion of this steel cord 102, as illustrated in the side view of the FIG. 5 and the top view of FIG. 7, the device for ripping gum 10 of the present invention is installed. Concretely, firstly, V-shaped cutting blade 1 which is formed such that it can move freely up and down is moved up, and the conveyor belt 100 is arranged between the roller-shaped pressing portions 6, and the space between the roller-shaped pressing portions 6 is adjusted, as well as the top portion of the cylindrical cutting blade 2 of an upper-lower divide type is removed and the exposed portion which is steel cords 102 is inserted into the lower portion of the cylindrical cutting blade 2. Thereafter, the top portion of the cylindrical cutting blade 2 is mounted again, the V-shaped cutting blade 1 is arranged such that it is moved downward, and inserted between the steel cords 102 of the conveyor belt 100.

Figure 8:
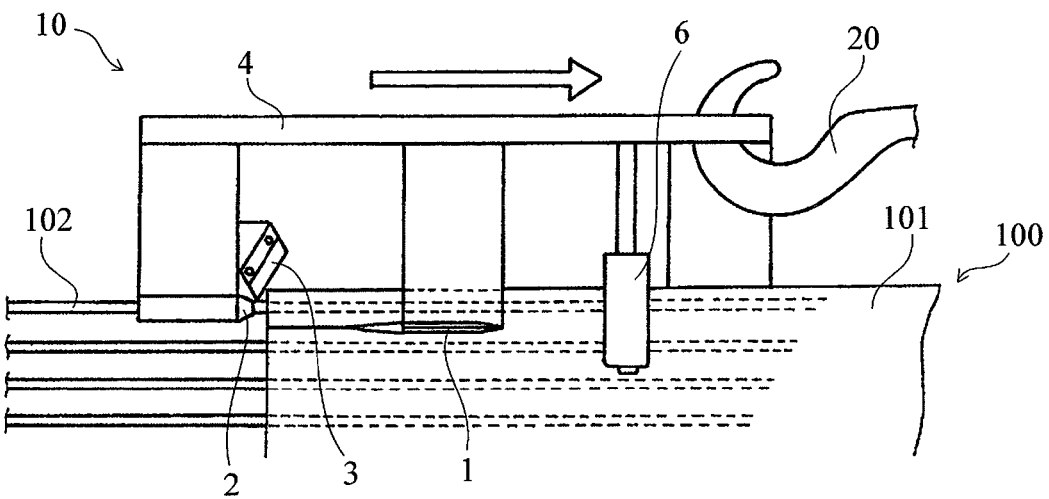
FIG. 8 is an explanatory view of another process of a method for ripping gum of a conveyor belt of the present invention.
Figure 9:
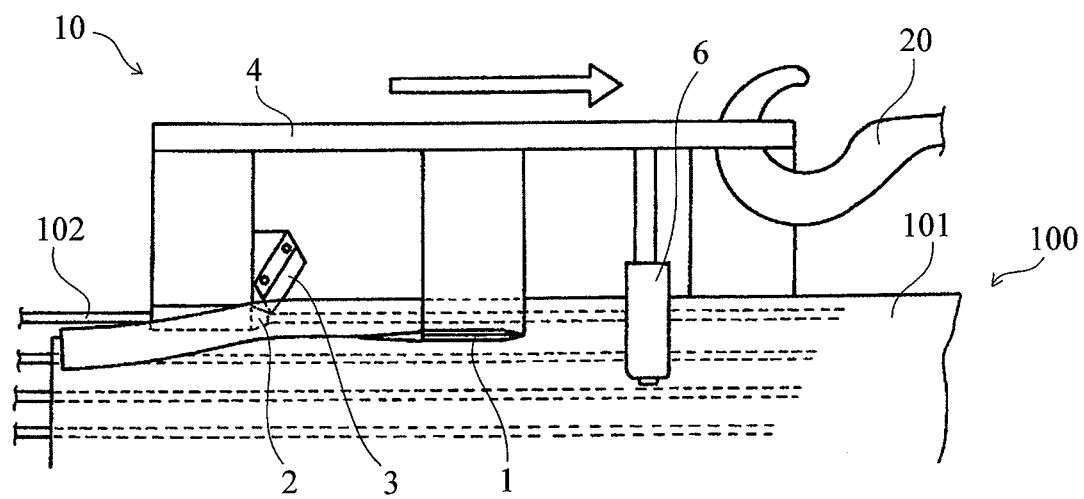
FIG. 9 is an explanatory view of still another process of a method for ripping gum of a conveyor belt of the present invention.

Thereafter, the hook 20 is hooked on the hooking portion 7A, 7B and by pulling it by a winch or the like, the ripping device 10 is moved in the end direction of the conveyor belt 100 (the traveling direction shown as an arrow in the figure) to rip the gum 101. Firstly, by moving the ripping device 10, as illustrated in FIG. 8, the individual steel cords 102 embedded in the gum 101 of the conveyor belt 100 are separated from each other by the V-shaped cutting blade 1. Next, by further moving the ripping device 10, as illustrated in FIG. 8, the gum 101 around each of the separated steel cords 102 is incised, and further, the gum 101 around each of the steel cords 102 is stripped off by the cylindrical cutting blade 2. In the present invention, by ripping the gum 101 by the V-shaped cutting blade 1, the linear cutting blade 3 and the cylindrical cutting blade 2 sequentially in the order mentioned in such a manner, without accompanying workload of workers and danger to workers, gum 101 around each of the steel cords 102 can be cut off nearly completely and sufficiently uniformly with good work efficiency.

In this manner, after ripping the steel cord 102 across the full length of the endless processed region, by repeating this procedure, all the steel cords 102 of the conveyor belt 100 can be ripped efficiently.

The movement of the device of the present invention is not limited to the examples illustrated. For example, the movement can also be attained by driving a rod hooked on the hooking portion 7A, 7B in the end direction of the conveyor belt 100 by a reciprocating movement means such as a screw mechanism, a gear mechanism or a cylinder. As for the movement of the device, the conveyor belt 100 is preferably fixed by clamping at the center portion side by a clamp means (not shown). Further, ripping of gum 101 in the present invention can also be performed without being subjected to the above-mentioned preprocessing, at the edge portion of the endless processed region of the conveyor belt 100 by ripping the steel cords 102 in nearly the same work as the pre-processing. The present invention is not limited to the above-mentioned embodiment, and can be carried out with various modifications without deviating from the spirit of the present invention.

DESCRIPTION OF SYMBOLS

1 V-shaped cutting blade
2 cylindrical cutting blade
3 linear cutting blade
4 base
5 gripper
6 roller-shaped pressing tool
7A, 7B hooking portion
10 device for ripping gum
11, 12 holder portion
20 hook
100 conveyor belt
101 gum
101a covering gum layer
101b bonding gum layer
102 steel cord

The invention claimed is:

1. A device for ripping gum of a conveyor belt in which individual steel cords embedded in the gum of the conveyor belt are separated from each other, and the gum is stripped off around each of the steel cords after the separation, the device for ripping gum comprising:
   a V-shaped cutting blade having an upper end, a lower end, and a cutting edge that extends in a direction from one of the ends to the other of the ends, the cutting edge extending in a first plane for separating a conveyor belt between individual steel cords,
   a cylindrical cutting blade arranged behind the cutting edge of the V-shaped cutting blade for stripping gum off around each of the steel cords; and
   a linear cutting blade arranged between the V-shaped cutting blade and the cylindrical cutting blade, the linear cutting blade having a cutting edge extending in a second plane, substantially perpendicular to the first plane, for extending along a width direction of the conveyor belt;
   wherein the V-shaped cutting blade, the cylindrical cutting blade, and the linear cutting blade are attached to a base of the device for ripping gum.

2. The device of claim 1, wherein the cylindrical cutting blade is arranged with a central axis of the cylindrical cutting blade offset from the first plane.

3. A method for ripping gum of a conveyor belt using a device for ripping gum wherein the conveyor belt includes individual steel cords embedded in the gum of the conveyor belt, the steel cords are separated from each other, and the gum is stripped off around each of the steel cords after the separation, the method comprising:
   separating individual steel cords embedded in the gum of the conveyor belt from each other by using a V-shaped cutting blade of the device for ripping gum, the V-shaped cutting blade having an upper end, a lower end, and a cutting edge that extends in a direction from one of the ends to the other of the ends, the cutting edge extending in a first plane, the cutting edge intersecting a traveling path of the conveyor belt, and thereafter, stripping the gum off around each of the separated steel cords by a cylindrical cutting blade of the device for ripping gum, the method further comprising incising the conveyor belt in a second plane using a linear cutting blade of the device for ripping gum, a cutting edge of the linear cutting blade extending in the second plane and the second plane being substantially perpendicular to the first plane, the incising comprising incising the gum around each of the steel cords after the individual steel cords are separated from each other by the V-shaped cutting blade and before the gum around each of the separated steel cords is stripped by the cylindrical cutting blade, wherein the V-shaped cutting blade, the cylindrical cutting blade, and the linear cutting blade are attached to a base of the device for ripping gum.

4. The method of claim 3, further comprising arranging the cylindrical cutting blade with a central axis of the cylindrical cutting blade offset from the first plane.

\* \* \* \* \*